United States Patent
Strahle

(10) Patent No.: US 7,898,671 B2
(45) Date of Patent: Mar. 1, 2011

(54) INTERFEROMETER HAVING A MIRROR SYSTEM FOR MEASURING A MEASURED OBJECT

(75) Inventor: Jochen Strahle, Weissach (DE)

(73) Assignee: Robert Bosch GmbH, Stuttgart (DE)

( * ) Notice: Subject to any disclaimer, the term of this patent is extended or adjusted under 35 U.S.C. 154(b) by 110 days.

(21) Appl. No.: 11/662,389

(22) PCT Filed: Jul. 22, 2005

(86) PCT No.: PCT/EP2005/053573
§ 371 (c)(1),
(2), (4) Date: Sep. 14, 2007

(87) PCT Pub. No.: WO2006/032560
PCT Pub. Date: Mar. 30, 2006

(65) Prior Publication Data
US 2008/0117429 A1 May 22, 2008

(30) Foreign Application Priority Data
Sep. 22, 2004 (DE) .................. 10 2004 045 806

(51) Int. Cl.
*G01B 11/02* (2006.01)
(52) U.S. Cl. ........................................ 356/496
(58) Field of Classification Search .................. 356/503, 356/485, 496
See application file for complete search history.

(56) References Cited

U.S. PATENT DOCUMENTS

| 6,504,615 B1 | 1/2003 | Abe et al. |
| 2001/0043333 A1* | 11/2001 | Groot et al. ................... 356/511 |
| 2006/0256347 A1 | 11/2006 | Linder |

FOREIGN PATENT DOCUMENTS

DE 103 25 443 12/2004

OTHER PUBLICATIONS

T. Dresel et al., "Three-dimensional sensing of rough surfaces by coherence radar," Appl. Opt. 31 (7), pp. 919-925, 1992.
"Interferometer Measures Both Sides of Disk"; Laser Focus World, Pennewell Publ. Tulsa, Sep. 1997, S.52-53, XP001182916, ISSN:1043-8092.

* cited by examiner

*Primary Examiner* — Tarifur Chowdhury
*Assistant Examiner* — Jonathan M Hansen
(74) *Attorney, Agent, or Firm* — Kenyon & Kenyon LLP

(57) ABSTRACT

An interferometric measuring device for measuring a measured object, in particular for thickness measurement of the measured object. A special-purpose objective having a mirror system is provided, which includes at least one first deflection mirror and one second deflection mirror and in which these are situated in such a way that the object beams incident on the first deflection mirror or on the second deflection mirror are directed respectively onto a first side or a second side, which is parallel thereto, of the measured object to be measured in a first beam path or a second beam path, respectively, which are antiparallel to one another. The mirror system additionally has at least one first position mirror for imaging the position of the measured object to be measured in relation to the first deflection mirror and/or the second deflection mirror.

8 Claims, 6 Drawing Sheets

INTERFEROMETER HAVING A MIRROR SYSTEM FOR MEASURING A MEASURED OBJECT

FIELD OF THE INVENTION

The present invention relates to an interferometric measuring device having a mirror system for measuring a measured object, in particular for thickness measurement of the measured object.

BACKGROUND INFORMATION

Interferometric systems are suitable for, inter alia, contactless examinations of surfaces of various measured objects. To acquire the surface contour of an object to be examined, an object beam from a light source of the interferometer hits the surface at the area to be measured. The object beam reflected from the surface is supplied to a detector of the interferometer and, together with a reference beam, forms an interference pattern, from which the path length difference of the two beams may be derived. This measured path length difference of the two beams corresponds to the topography change of the surface.

In particular using a white light interferometer, in which the light source outputs short coherent radiation, it is also possible to scan the measured object using depth scanning. As explained in unpublished German Patent application No. DE 103 25 443.9, for example, the short coherent radiation is divided via a beam splitter into an object beam and a reference beam. The object surface to be measured is imaged via an objective on an image recorder, such as a CCD camera ("charge-coupled device" camera), and has the reference wave formed by the reference beam superimposed on it. Depth scanning may be performed by moving a reference mirror reflecting the reference beam or the objective in relation to the measuring device. During movement of the object, the image plane of the object and the reference plane are in the same plane. During depth scanning, the object remains fixed in the field of view of the CCD camera, and the object is only moved in the depth axis in relation to the reference plane. In this way, technical surfaces having a depth resolution in the range of a few nanometers may be measured. The technical basis of this measurement method is also found in the article "Three-dimensional sensing of rough surfaces by coherence radar" (T. Dresel, G. Häusler, H. Venzke, Appl. Opt. 31 (7), p. 919-925, 1992).

It is often desirable to image more than one side of the measured object. In practice, for example, to determine the thickness of a measured object, such as the thickness of a disk, both sides of the disk are measured using object beams through a mirror system in a special-purpose objective. For this purpose, the object beams are deflected perpendicularly onto the two sides of the disk by two deflection mirrors. The beams reflected from the sides of the disk are supplied to the image recorder and used together with the reference beams for recording the correlogram and finally analyzed to obtain the height data. As already explained above, a depth scan is performed during the measurement, or, in other words, the sides of the measured object to be measured are moved through the focal plane of the camera. Alternatively, it is also possible to change the focal plane of the camera through electrically controllable lenses or lens systems.

A disadvantage of the mirror system described, however, is that the relative position of the measured object in relation to the two deflection mirrors cannot be checked. Optimum positioning of the measured object is provided when the two beams, which are directed to the first or second side of the measured object, respectively, and, having been reflected therefrom, are supplied to the image recorder, must cover an equally long light path in each case. For this purpose, the measured object must be positioned precisely in the middle between the two deflection mirrors. If the measured object is positioned offset because of a lack of checking capability, i.e., the light paths of the two beams have different lengths, this results in a longer measurement duration in comparison to optimum positioning.

If the measured object is incorrectly positioned by approximately 20 µm, an additional scanning path of 2×20 µm=40 µm must be covered. A typical measuring speed in scanning interferometers is approximately 5 µm/second. This results in an additional measurement time of 8 seconds. When checking all measured objects using cycle times of a few seconds, this time dimension is unacceptable, particularly in industrial manufacturing.

SUMMARY OF THE INVENTION

The interferometric measuring device according to the present invention has the advantage over the related art that it is possible to check the relative position of the measured object in relation to the deflection mirrors. In this way, the relative positioning of the relevant components may be optimized in a next step, as a result of which a more rapid measurement is achieved. The measurement time is also significantly shortened. A second image recorder may nonetheless advantageously be dispensed with.

BRIEF DESCRIPTION OF THE DRAWINGS

Exemplary embodiments of the present invention are explained in greater detail on the basis of the drawing and the following description.

DETAILED DESCRIPTION

Figure 1:
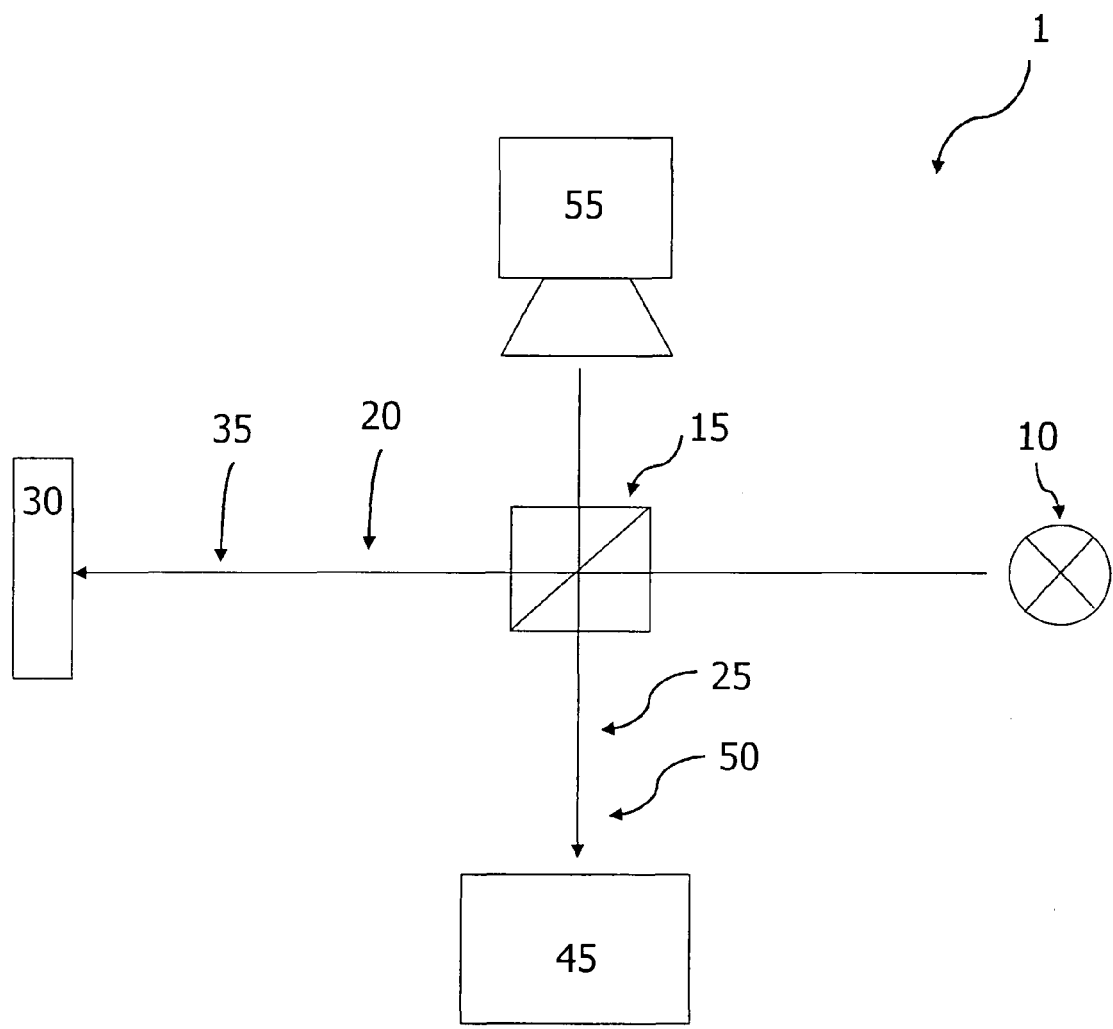
FIG. 1 shows a system of optical components of an interferometer in a top view.

A basic construction having the optical components of an interferometric measuring device 1 according to Michelson is shown in a top view in FIG. 1. White light interferometry (short coherent interferometry) is applied here as the measurement method, because of which light source 10 emits short coherent radiation. The light is divided via a beam splitter 15 into a reference beam 20 and an object beam 25. Reference beam 20 is reflected further by a reference mirror 30 situated in reference light path 35 and reaches an image recorder 55 again via a beam splitter 15. The light waves of object beams 25, which were deflected via a special-purpose objective 45 situated in object light path 50 onto a measured object 5 and reflected therefrom, are superimposed there on the light waves of reference beams 20.

Figure 2:
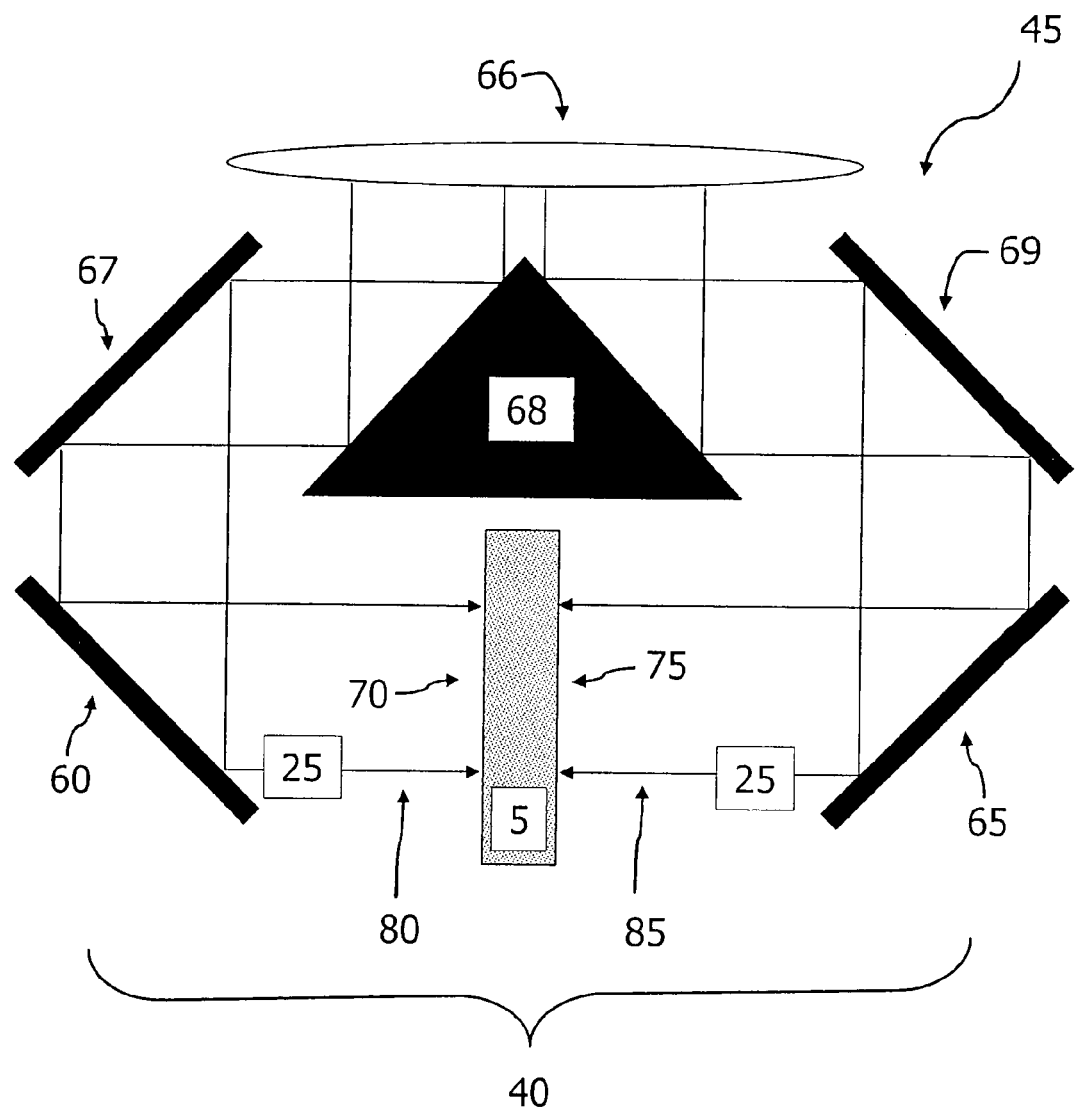
FIG. 2 shows a system of optical components of a special purpose objective in a top view.
Figure 3:
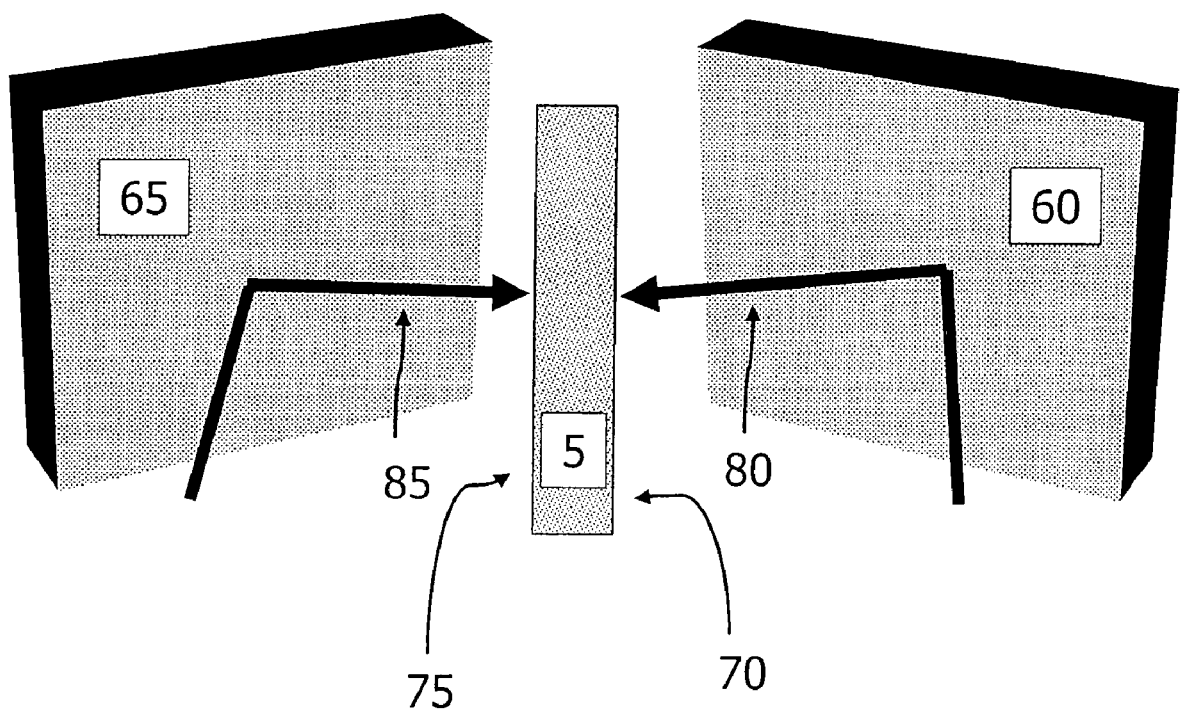
FIG. 3 shows a mirror system in the special-purpose objective according to the related art in a perspective view.

Mirror system 40 of special-purpose objective 45, whose components are shown in FIG. 2, ensures irradiation and therefore imaging of measured object 5 from two opposite directions. The thickness of a measured object 5, such as the thickness of a disk, may thus be determined, for example. Mirror system 40 of special-purpose objective 45 has at least one first deflection mirror 60 and one second deflection mirror 65, these being situated in such a way that object beams 25 incident on first deflection mirror 60 or second deflection mirror 65 are directed respectively onto a first side 70 or a second side 75, which is parallel thereto, of measured object 5 to be measured in a first beam path 80 or a second beam path 85, respectively, which are antiparallel to one another. Object beams 25 are typically incident perpendicularly on first side 70 or second side 75 of the disk. FIG. 3 shows the system of both deflection mirrors 60, 65 having the disk to be measured in a perspective view for illustration. Special-purpose objective 45 and/or mirror system 40 may also have further optical components such as a lens 66, a prism 68, or further mirror elements 67, 69, which divide object beams 25 and expediently direct them onto both deflection mirrors 60, 65; however, it is not possible using these prism elements 68 and mirror elements 67, 69 to check the relative position of the disk in relation to deflection mirrors 60, 65. The embodiment of the measuring device described up to this point is known from practice.

Figure 4:
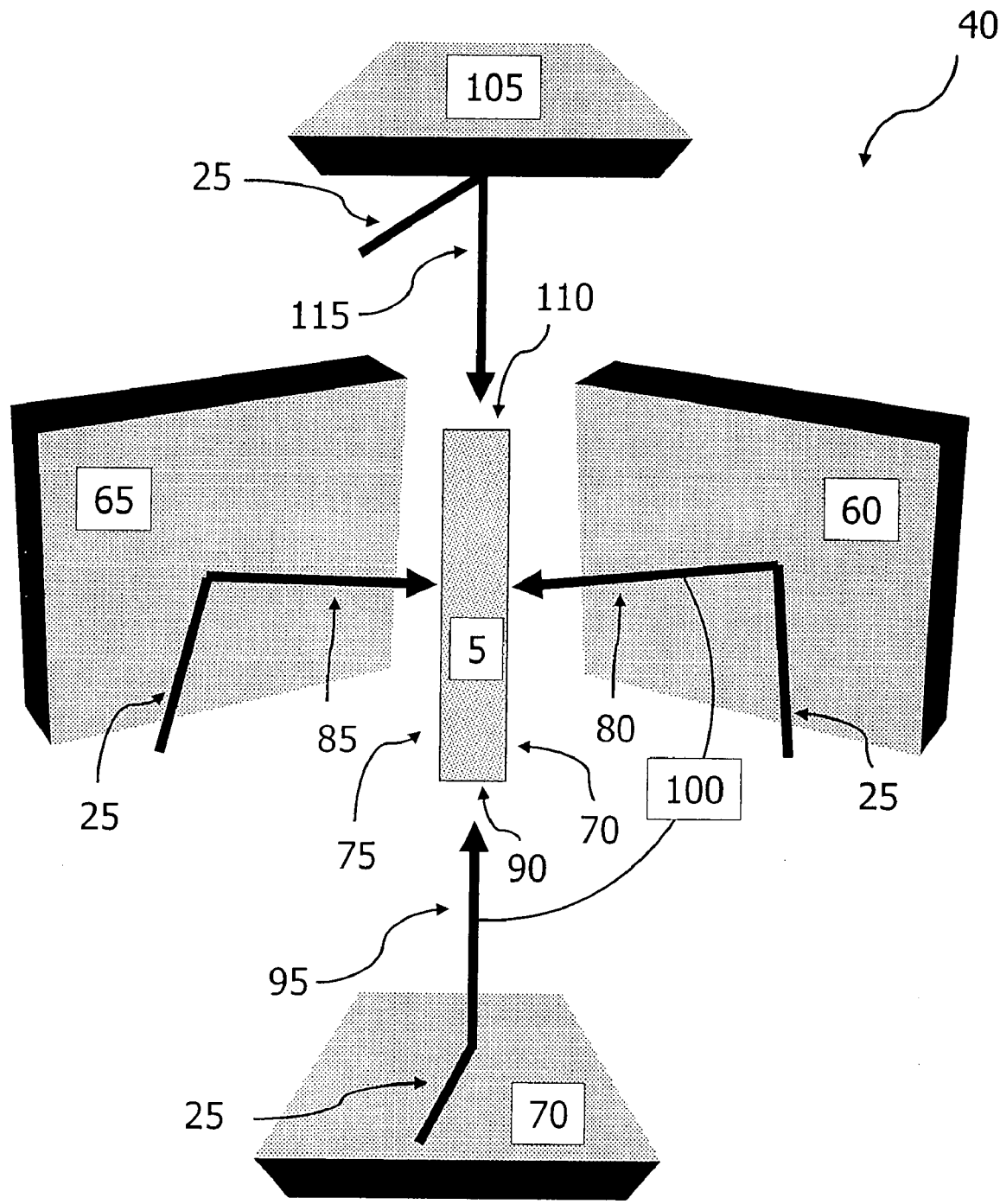
FIG. 4 shows a mirror system in the special-purpose objective according to the present invention in a perspective view.

According to the present invention, mirror system 40, as shown in FIG. 4 in a perspective view, additionally has at least one first position mirror $70^1$ for imaging the position of measured object 5 to be measured in relation to first deflection mirror 60 and/or second deflection mirror 65. First position mirror 70 is preferably situated in such a way that object beams 25 incident on position mirror 70 are directed onto a third side 90 of measured object 5 to be measured, which is perpendicular to first side 70 and second side 75, in a third beam path 95. Third side 90 of measured object 5 to be measured is, for example, the thin edge side of the disk. In this case, antiparallel beam paths 80, 85 of first and second deflection mirrors 60, 65 enclose an angle 100 greater than 0° and less than 180° with third beam path 95, i.e., the directions of antiparallel beam paths 80, 85 and of third beam path 95 are neither parallel nor antiparallel. Angle 100 is preferably precisely 90°, i.e., it is a right angle.

Furthermore, mirror system 40 may have a second position mirror 105, which is situated in such a way that object beams 25 incident on second position mirror 105 are directed onto a fourth side 110 of measured object 5 to be measured, which is parallel to third side 90, in a fourth beam path 115. Fourth beam path 115 preferably runs precisely antiparallel to third beam path 90.

Figure 5:
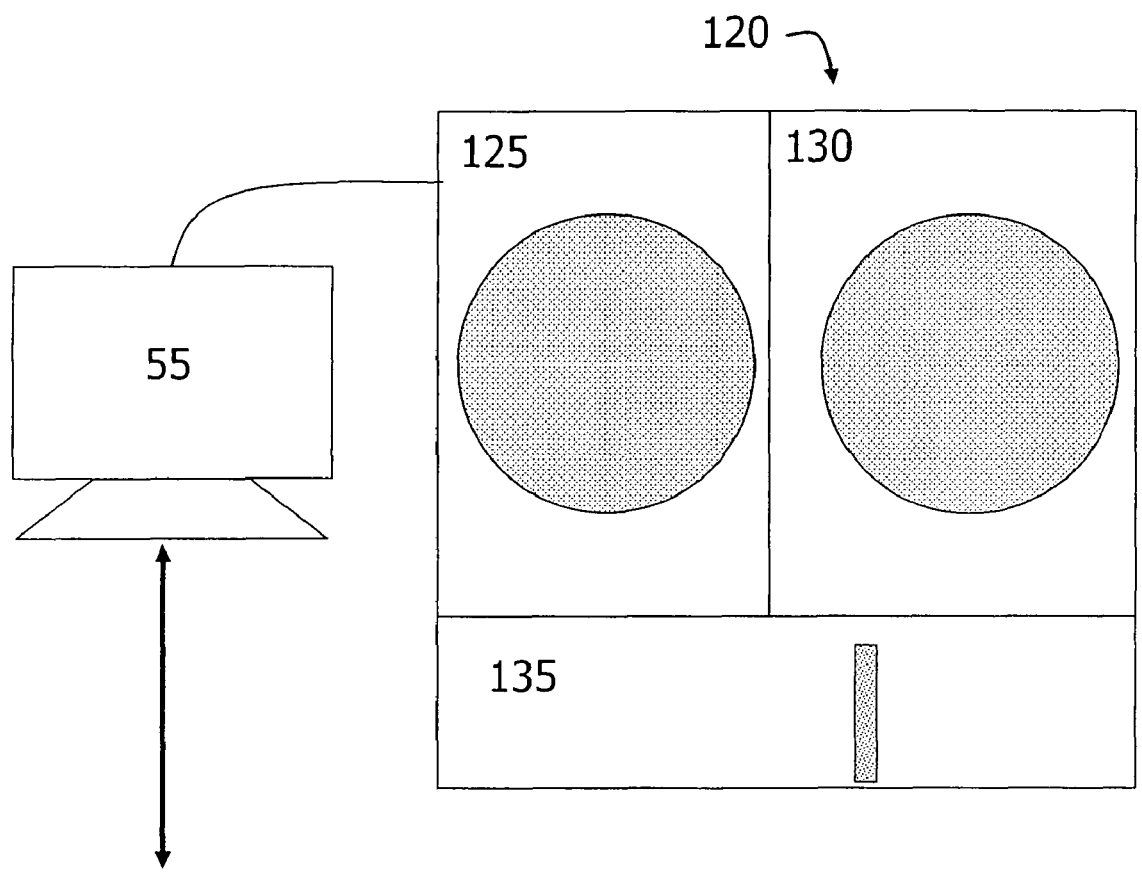
FIG. 5 shows images of the measured object from different sides recorded in the image recorder with nonoptimal positioning.

Object beams 25 in first beam path 80, second beam path 85, third beam path 90, and alternatively in fourth beam path 115 are incident from four directions on four different sides 70, 75, 90, 110 of measured object 5 and are reflected therefrom and supplied to image recorder 55. These incident object beams 25 each have previously described reference beams 20 superimposed on them. Image recorder 55 is, for example, a camera, in particular a CCD or CMOS camera ("complementary metal oxide semiconductor" camera), which is connected to an image output unit 120, as shown in FIG. 5. Recordings of measured object 5 from different viewing directions may thus be shown by image output unit 120. The recording of first side 70 of measured object 5 may be seen in first image detail 125, while the recording of second side 75 of measured object 5 is shown in second image detail 130. In addition, a third image detail 135 is provided, in which third side 90 of measured object 5 is to be observed. Using third image detail 135, the relative position of measured object 5 in relation to both deflection mirrors 60, 65 may be checked. The case of nonoptimal positioning is shown in FIG. 5. Precise determination of the relative positioning of measured object 5 is performed by image recorder 55, since image recorder 55 is preferably a camera having analysis software for determining the position of measured object 5.

Figure 6:
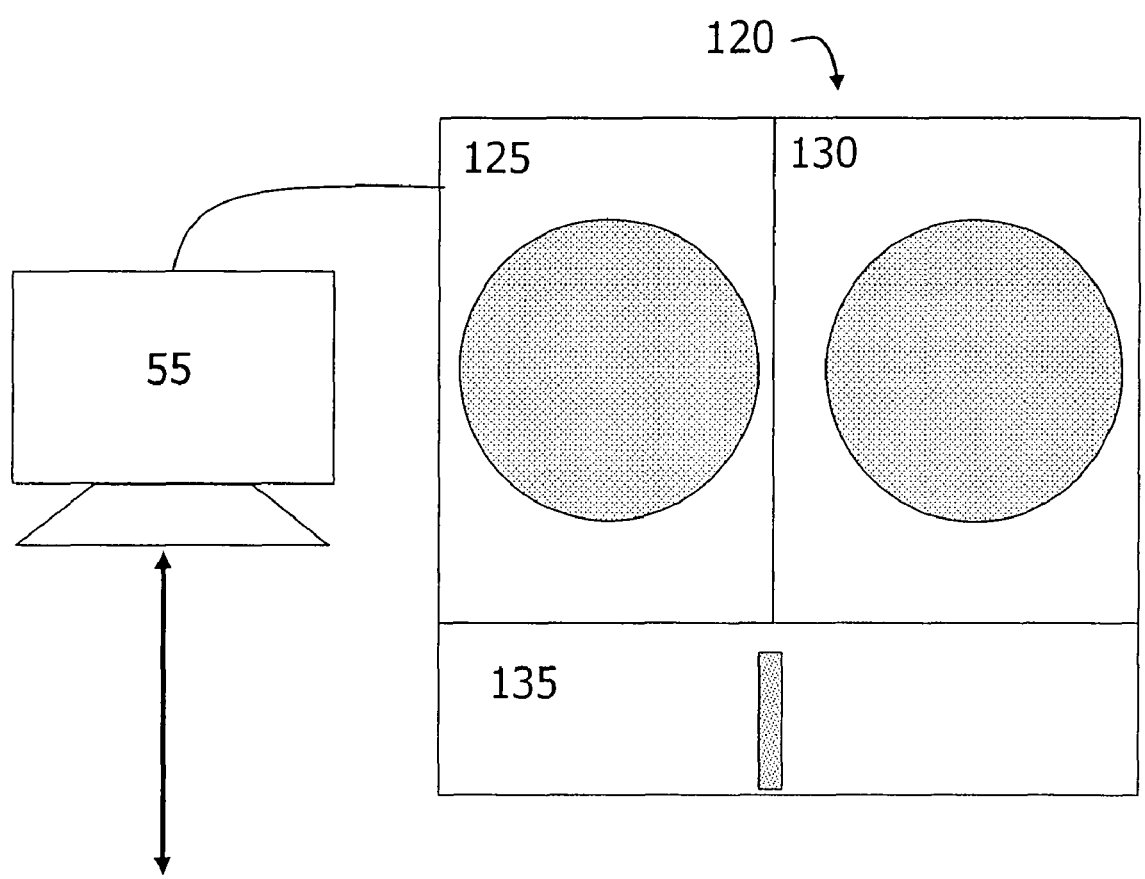
FIG. 6 shows images of the measured object from different sides recorded in the image recorder with optimal positioning.

By determining the position of measured object 5, the position may be corrected. Basically, the optical path between measured object 5 and image recorder 55 is to be adapted, i.e., measured object 5 is displaced in relation to the optical system. Ideally, measuring device 1 itself has a correction unit for adapting the optical path between measured object 5 and image recorder 55. The correction unit may include at least one moving table, a piezoelectric element, an optically active element, or a combination thereof. As shown in FIG. 6, after an automatic, successful position correction, the corresponding position of measured object 5 may be ascertained on third image detail 135 of image output unit 120. Furthermore, the position of measured object 5 may be imaged completely, partially, or distortedly using deflection mirrors 60, 65. Thus, for example, it is sufficient if only the distance between first side 70 of measured object 5 and first deflection mirror 60 is imaged, since the distance between both deflection mirrors 60, 65 is known. Simultaneously, both sides 70, 75 of measured object 5 are imaged sharply in first image detail 125 and second image detail 130 in the event of optimum positioning of measured object 5. The actual scanning of measured object 5 may now be performed. The shortening of the measurement time achieved by the present invention was confirmed in practice.

What is claimed is:

1. An interferometric measuring device for measuring a measured object, comprising:
   a light source;
   a beam splitter for forming reference beams and object beams;
   a reference mirror in a reference light path;
   a special-purpose objective in the object light path and having a mirror system;
   an image recorder, wherein:
      the mirror system includes at least one first deflection mirror and at least one second deflection mirror,
      the at least one first deflection mirror and the at least one second deflection mirror are situated in such a way that the object beams incident on one of the at least one first deflection mirror and the at least one second deflection mirror are directed respectively onto one of a first side and a second side, which is parallel thereto, of the measured object to be measured in one of a first beam path and a second beam path, respectively, which are antiparallel to one another,
      the mirror system includes at least one first position mirror for imaging a position of the measured object to be measured in relation to at least one of the at least one first deflection mirror and the second deflection mirror, and
      the position of the measured object in relation to the at least one of the two deflection mirrors is determined prior to adapting an optical path between the measured object and the image recorder; and
   a correction unit for adapting the optical path between the measured object and the image recorder,
   wherein the measured object is displaced in relation to the at least one of the two deflection mirrors.

2. The interferometric measuring device as recited in claim 1, wherein the interferometric device performs a thickness measurement of the measured object.

3. The interferometric measuring device as recited in claim 1, wherein:
the at least one first position mirror is situated in such a way that the object beams incident on the at least one position mirror are directed onto a third side of the measured object to be measured in a third beam path, the third side being perpendicular to the first side and the second side.

4. The interferometric measuring device as recited in claim 3, wherein the antiparallel beam paths enclose an angle greater than 0° and less than 180° with the third beam path.

5. The interferometric measuring device as recited in claim 4, wherein the angle is a right angle.

6. The interferometric measuring device as recited in claim 5, wherein:
the mirror system includes a second position mirror situated in such a way that the object beams incident on the second position mirror are directed onto a fourth side of the measured object in a fourth beam path, the fourth side being parallel to the third side.

7. The interferometric measuring device as recited in claim 1, wherein:
the image recorder includes a camera provided with analysis software for determining the position of the measured object.

8. The interferometric measuring device as recited in claim 1, further comprising one of: at least one moving table, a piezoelectric element, an optically active element, and a combination including at least two of the at least one moving table, the piezoelectric element, and the optically active element.

* * * * *